US006207791B1

(12) United States Patent
Bright et al.

(10) Patent No.: US 6,207,791 B1
(45) Date of Patent: Mar. 27, 2001

(54) LOW FORMALDEHYDE EMITTING CROSSLINKING AGENTS, PROCESS OF PREPARATION AND CURABLE COMPOSITIONS THEREOF

(75) Inventors: John H. Bright, Norwalk; Barry A. Lawless, Milford; Robert G. Lees, Stamford; Lon-Tang Wilson Lin, Bethel, all of CT (US); Jeno G. Szita, Budapest (HU)

(73) Assignee: Cytec Technologies Corp., Wilmington, DE (US)

( * ) Notice: Subject to any disclaimer, the term of this patent is extended or adjusted under 35 U.S.C. 154(b) by 0 days.

(21) Appl. No.: 09/635,107

(22) Filed: Aug. 9, 2000

Related U.S. Application Data

(60) Continuation of application No. 09/127,182, filed on Jul. 31, 1998, now Pat. No. 6,107,441, which is a division of application No. 08/920,202, filed on Aug. 15, 1997, now Pat. No. 5,821,323.

(51) Int. Cl.$^7$ ..................................................... C08G 9/24
(52) U.S. Cl. ................ 528/254; 528/248; 528/482; 528/492; 528/494; 528/495; 525/509; 525/511; 427/372.2; 427/385.5; 427/388.3
(58) Field of Search .................................. 528/254, 248, 528/482, 492, 494, 495; 525/509, 511; 427/372.2, 385.5, 388.3

(56) References Cited

U.S. PATENT DOCUMENTS

| | | | |
|---|---|---|---|
| 4,081,426 | 3/1978 | Michel et al. | 260/67.6 |
| 4,101,520 | 7/1978 | Boldizar | 528/248 |
| 4,129,681 | 12/1978 | Anderson et al. | 428/524 |
| 4,183,832 | 1/1980 | Meunier et al. | 260/17.3 |
| 4,243,705 | 1/1981 | Yapp et al. | 427/386 |
| 4,276,212 | 6/1981 | Khanna et al. | 260/39 R |
| 4,330,458 | 5/1982 | Spinelli et al. | 524/512 |
| 4,374,164 | 2/1983 | Blank | 427/385.5 |
| 4,425,466 | 1/1984 | Santer et al. | 524/512 |
| 4,433,143 | 2/1984 | Santer et al. | 544/196 |
| 4,873,298 | 10/1989 | Ryntz | 525/479 |
| 5,047,466 | 9/1991 | Busse et al. | 524/597 |
| 5,155,201 | 10/1992 | Gardon et al. | 528/78 |

FOREIGN PATENT DOCUMENTS

| | | |
|---|---|---|
| 301293 | 11/1992 | (DE) . |
| 2 254 328 | 10/1992 | (GB) . |
| 51-125102 | 11/1976 | (JP) . |

OTHER PUBLICATIONS

"High Solids Amino Crosslinking Agents", American Cyanamid Company (1991).
"CYCAT®Catalysts For Amino Cross–Linking Agents", American Cyanamid Company (1979).
PCT International Search Report International Application No. PCT/US96/09054.
"Melamine–Formaldehyde Cross–Linking Agentsfor Surface Coatings," CYTEC Industries, Inc. (1993).

*Primary Examiner*—Duc Truong
(74) *Attorney, Agent, or Firm*—Pennie & Edmonds LLP

(57) ABSTRACT

Described is a liquid, partially alkoxymethylated melamine crosslinker composition having from about 2.6 to about 4.6 moles of combined formaldehyde per mole of melamine, from about 1.4 to about 4.4 moles of alkyl per mole of melamine, from about 1.3 to about 3.4 moles of NH per mole of melamine, a free formaldehyde level of less than about 0.5 weight percent based on 100 percent solids, and an N-methylol level of less than about 6.0 weight percent; processes for its preparation; a low formaldehyde emitting curable composition containing the crosslinker; as well as a method of coating a substrate and substrates so coated.

39 Claims, No Drawings

200
LOW FORMALDEHYDE EMITTING CROSSLINKING AGENTS, PROCESS OF PREPARATION AND CURABLE COMPOSITIONS THEREOF

This application is a Continuation of application Ser. No. 09/127,182 filed Jul. 31, 1998 now U.S. Pat. No. 6,107,441 which is a Division of application Ser. No. 08/920,202 filed Aug. 15, 1997 now U.S. Pat. No. 5,821,323.

BACKGROUND OF THE INVENTION

1. Field of the Invention

This invention relates to low free formaldehyde and low N-methylol group containing melamine derived crosslinker compositions and to low formaldehyde emitting thermosetting coating compositions based on these crosslinkers compositions, which coating compositions can provide durable, substantially defect-free films upon curing. The low formaldehyde emitting thermosetting coating compositions in accordance with the present invention contain, in their broadest concept, a low free formaldehyde and low N-methylol group containing partially alkoxymethylated high NH (high imino) melamine crosslinking agent and a polyfunctional material containing functional groups capable of reacting therewith.

2. Description of Related Art

Currently, the majority of important industrial coatings include melamine-formaldehyde crosslinked liquid systems. Such liquid coatings which employ partially or fully alkoxymethylated amino resin crosslinkers are in general well-known to those of ordinary skill in the art, as exemplified by numerous references including, for example, U.S. Pat. No. 4,081,426, U.S. Pat. No. 4,101,520, U.S. Pat. No. 4,129,681, U.S. Pat. No. 4,243,705, U.S. Pat. No. 4,276,212, U.S. Pat. No. 4,330,458, U.S. Pat. No. 4,374,164, U.S. Pat. No. 4,433,143, U.S. Pat. No. 4,425,466, U.S. Pat. No. 4,873,298, U.S. Pat. No. 5,155,201, JP-A-51125102 and GB-A-2254328, all of which are incorporated herein by reference for all purposes as if fully set forth. These and other references disclose a wide variety of backbone resins, catalysts, additives and amino resin crosslinkers therefor including, for example, tris- and tetra-substituted melamines for coatings applications. The present invention is concerned with liquid amino resin crosslinkers and, in particular, with the alkoxymethyl substituted melamine derived crosslinkers.

A problem with melamine formaldehyde resins is that they emit formaldehyde during the curing process, creating potential health and safety hazards and environmental pollution problems. Because of the health, safety and environmental concerns associated with large scale use of compositions containing melamine-formaldehyde crosslinking agents, demand for lower formaldehyde emitting coatings has steadily increased in recent years providing an incentive to find a practical solution to the problem.

One common approach to solving this problem has been the use of low free formaldehyde containing melamine derived crosslinking agents. While employing low free formaldehyde crosslinkers has been generally helpful to some extent, the improvement has been modest because preparation of low free formaldehyde containing crosslinkers has been difficult and emission problems have persisted even when low free formaldehyde containing crosslinkers are employed. Surprisingly, formaldehyde emissions during cure are greater than the actual free formaldehyde levels present in the starting coatings compositions. The origin of the excess formaldehyde released during cure has not been completely elucidated to date and, as a result, the problem of formaldehyde discharge into the environment continues to concern the coatings industry.

It has now been surprisingly discovered, in accordance with the present invention, that formaldehyde emission levels of well-known melamine-formaldehyde crosslinked systems can be reduced by replacing the previous melamine formaldehyde crosslinkers with a certain class of low free formaldehyde, low N-methylol and relatively high NH group containing liquid alkoxymethylated melamine resins. Curable compositions containing these crosslinkers of the present invention cure rapidly under normal cure conditions to produce durable films without emitting unacceptably high levels of formaldehyde.

SUMMARY OF THE INVENTION

As indicated above, the present invention is a liquid, partially alkoxymethylated melamine crosslinker composition having from about 2.6 to about 4.6 moles of combined formaldehyde per mole of melamine, from about 1.4 to about 4.4 moles of alkyl per mole of melamine, from about 1.3 to about 3.4 moles of NH per mole of melamine, a free formaldehyde level of less than about 0.5 weight percent based on 100 percent solids, and an N-methylol level of less than about 6.0 weight percent, preferably less than about 5.0 weight percent, and more preferably less than about 4.0 weight percent, based on 100 percent solids.

The present invention is further a low formaldehyde emitting curable composition which, when cured, produces a formaldehyde emission of less than about 7.5 weight percent based on the weight of the crosslinker, comprising the above-described crosslinker of the present invention and a polyfunctional material reactive therewith. These compositions are rapid curing but do not emit unacceptably high levels of formaldehyde.

The present invention is still further a process for preparing the crosslinkers of the invention said process comprising the step of contacting a liquid partially alkoxymethylated melamine crosslinker and a reagent selected from the group consisting of an amino group containing compound and an etherification agent, as described in further detail below.

The present invention is still further a method of coating a substrate by applying onto a substrate the low formaldehyde emitting curable compositions of the invention and then heat curing the so applied coating.

Finally, the present invention is crosslinked film or coated article prepared by the above method of coating. Such crosslinked films possess good hardness, impact resistance and solvent resistance, and are substantially surface defect-free with desirable appearance characteristics such as gloss and lack of pinholes or blisters.

These and other features and advantages of the present invention will be more readily understood by those of ordinary skill in the art from a reading of the following detailed description.

DETAILED DESCRIPTION OF THE PREFERRED EMBODIMENTS

The Melamine Crosslinking Agent

The novel melamine crosslinking agents of the present invention, as indicated above, have from about 2.6 to about 4.6 moles of combined formaldehyde per mole of melamine, from about 1.4 to about 4.4 moles of alkyl per mole of melamine, from about 1.3 to about 3.4 moles of NH per mole of melamine, a free formaldehyde level of less than about 0.5 weight percent based on 100 percent solids, and an N-methylol level of less than about 6.0 weight percent, preferably less than about 5.0 weight percent, and more preferably less than about 4.0 weight percent, based on 100 percent solids.

In one preferred embodiment, referred to herein as very high NH crosslinkers, the combined formaldehyde to melamine molar ratio is preferably in the range of from about 2.6 to about 3.4, and more preferred ratio is in the range of from about 3.0 to about 3.4; the alkyl to melamine molar ratio is preferably in the range of from about 1.4 to about 3.2, and more preferably in the range of from about 2.4 to about 2.8; and the NH to melamine molar ratio is preferably in the range of from about 1.8 to about 3.4, and more preferably in the range of from about 2.0 to about 2.8.

In a second preferred embodiment, referred to herein as moderately high NH crosslinkers, the combined formaldehyde to melamine molar ratio is preferably in the range of from about 3.6 to about 4.6, and more preferably is in the range of from about 3.8 to about 4.2; the alkyl to melamine molar ratio is preferably in the range of from about 2.4 to about 4.4, and more preferably in the range of from about 2.6 to about 3.8; and the NH to melamine molar ratio is preferably in the range of from about 1.3 to about 2.4, and more preferably in the range of from about 1.4 to about 1.8. As an especially preferred such moderately high NH crosslinker may be mentioned one wherein the combined formaldehyde to melamine molar ratio in the range of from about 3.8 to about 4.0, the alkyl to melamine molar ratio in the range of from about 2.6 to about 3.0, and an NH to melamine molar ratio in the range of from about 1.4 to about 1.6.

When cured, the liquid partially alkoxymethylated-melamine crosslinker compositions of the invention produce a formaldehyde emission of less than about 7.5 weight percent based on the weight of the crosslinker, and in some cases, particularly in cases such as those prepared by a process which includes both treatment with an amino group containing compound and etherification steps as described below, they produce a formaldehyde emission of less than about 4.3 weight percent based on the weight of the crosslinker.

The liquid partially alkoxymethylated melamine crosslinkers of the present invention preferably comprise at least 30 weight percent monomeric species, the balance being s complex mixture of products including, for example, monomeric bis-, tris-, and tetra-substituted alkoxymethylated melamine derivatives, N,N'-bis-alkoxyalkyl melamines, N,N',N"-tris-alkoxyalkyl melamines, and N,N',N",N"-tetrakis-alkoxyalkyl melamines, oligomers derived from the di-, tri-, and tetra-substituted derivatives, and other variations recognizable by those of ordinary skill in the relevant art. The preferred crosslinker for use in the present invention preferably comprises from about 40 wt % to about 65 wt % monomer. The term "Wt % monomer" for the purposes of the present invention is equated with the area percent of the monomeric portion of a curve determined by analysis of the partially alkoxymethylated melamine crosslinker by well-known high performance size exclusion chromatography techniques.

Each alkoxy group of the present partially alkoxymethylated melamines is independently based on an alkyl group preferably selected from the group consisting of linear, branched and cyclic alkyls of 1 to 20 carbon atoms. Especially preferred alkyl groups are lower alkyls of 1 to 8 carbon atoms including, for example, methyl, ethyl, 1-propyl, 2-propyl, 1-butyl, 2-butyl, iso-butyl, tert-butyl, 1-pentyl, 1-hexyl, cyclohexyl and 2-ethyl-1-hexyl. The most preferred alkyls are methyl, ethyl and butyl groups. Also preferred are crosslinkers having mixed alkyl groups, such as mixed methyl and butyl groups.

Curable Compositions

The low formaldehyde emitting curable composition of the invention is characterized as being a low formaldehyde emitting composition which, when cured, produces a formaldehyde emission of less than about 7.5 weight percent, preferably less than about 6.5 weight percent, and more preferably less than about 4.3 weight percent, based on the weight of the crosslinker.

In general, the curable compositions of the present invention can be based on any well-known melamine resin crosslinked composition in which all or a portion of the existing melamine resin is replaced with the crosslinker composition of the present invention. For general description purposes, these curable composition may be characterized as comprising (i) the crosslinker compositions of the present invention and (ii) a polyfunctional material capable of reacting therewith.

The polyfunctional material containing a functionality capable of reacting with the liquid partially alkoxymethylated melamine crosslinkers of the invention under normal coatings cure conditions (generally between about 25° C. to about 250° C.) are well known backbone resins widely used in amino resin crosslinked coatings. These resins contain at least two reactive functionalities each preferably independently selected from the group consisting of hydroxy, carboxy, amino, amido, carbamato, mercapto, and a group convertible thereto. The preferred polyfunctional materials are hydroxyfunctional or carboxyfunctional acrylic or polyester backbone resins, with hydroxyfunctional materials being especially preferred. Illustrative examples of polyfunctional materials include acrylic resins which may be obtained by the copolymerization of acrylic or methacrylic esters with hydroxyfunctional acrylic or methacrylic esters such as hydroxyethyl acrylate or methacrylate, optionally with simultaneous use of additional vinyl compounds such as, for example, styrene. Illustrative examples of polyfunctional materials also include polyester resins which may be obtained, for example, by the reaction of polycarboxylic acids with excess quantities of polyhydric alcohols. Suitable hydroxyfunctional resins also include epoxy or polyurethane prepolymers, alkyds, and the like.

In general, such resins may have pendent or terminal hydroxyl functionalities and preferably have the following characterstics: weight average molecular weights (Mw) of from about 750 to about 7000, and more preferably from about 2000 to about 5000; and hydroxyl numbers of from about 20 to about 100 mg KOH/g resin, more preferably from about 25 to about 60 mg KOH/g resin, and especially from about 25 to about 40 mg KOH/g resin. For waterborne coatings applications, materials having much higher molecular weights are generally preferred. Other suitable hydroxyl functional resins will be readily recognized by those of ordinary skill in the art.

Commercially available examples of suitable polyfunctional hydroxy group containing materials include JONCRYL® 500 acrylic resin (S. C. Johnson & Sons, Racine, Wis.), ACRYLOID® AT-400 acrylic resin (Rohm & Haas, Philadelphia, Pa.), CYPLEX® 1531 polyester resin (Cytec Industries, West Paterson, N.J.), CARGILL® 3000 and 5776 polyester resins (Cargill, Minneapolis, Minn.), TONE® polyester resin (Union Carbide, Danbury, Conn.), K-FLEX® XM-2302 and XM-2306 resins (King Industries, Norwalk, Conn.), CHEMPOL® 11-1369 resin (Cook Composites and Polymers, Port Washington, Wis.), JONCRYL® 540 acrylic emulsion polymer (S. C. Johnson & Sons, Racine, Wis.), RHOPLEX® AC-1024 acrylic emulsion resin (Rohm & Haas, Philadelphia, Pa.), XC® 4005 water reducible acrylic resin (Cytec Industries, West Paterson, N.J.), CRYLCOAT® 3494 solid hydroxy terminated polyester resin (UCB CHEMICALS USA, Smyrna, Ga.), RUCOTE® 101 polyester resin (Ruco Polymer, Hicksville, N.Y.), JONCRYL® SCX-800-A and SCX-800-B hydroxyfunctional solid acrylic resins (S. C. Johnson & Sons, Racine, Wis.), and the like. Examples of carboxyfunctional resins include CRYLCOAT® solid carboxy terminated polyester resin (UCB CHEMICALS USA, Smyrna, Ga.), RUCOTE® 101 polyester resin (Ruco Polymer Corporation, Hicksville, N.Y.), ALFTALAT® 745 hydroxyfunctional polyester resin (Hoechst Corporation) and ARAKOTE® 3010 carboxy terminated polyester (Ciba-Geigy Corporation, Ardsley, N.Y.). For solvent borne coatings, liquid polyfunctional hydroxy group containing materials are preferred; however, a solid polyfunctional hydroxy group containing material may be used in cases when the solids are soluble in the solvent used in a particular formulation. Resins containing amino, amido, carbamato, or mercapto groups, including groups convertible thereto, may be prepared by known methods including copolymerizing a suitably functionalized monomer with a comonomer capable of copolymerizing therewith.

The curable composition of the present invention may further comprise a cure catalyst, which again are in general well known to those of ordinary skill in the art. The cure catalysts usable in the present invention include, for example, sulfonic acids, aryl, alkyl, and aralkyl acid phosphates, aryl, alkyl, and aralkyl acid pyrophosphates, carboxylic acids, sulfonimides, mineral acids, Lewis acids, organometallic compounds and a mixture thereof. Of the above acids, sulfonic acids are preferred. Examples of the sulfonic acids include benzenesulfonic acid, para-toluenesulfonic acid, dodecylbenzenesulfonic acid, naphthalenesulfonic acid, dinonylnaphthalenedisulfonic acid, and a mixture thereof. Examples of the aryl, alkyl, and aralkyl phosphates and pyrophosphates include phenyl, para-tolyl, methyl, ethyl, benzyl, diphenyl, di-para-tolyl, di-methyl, di-ethyl, di-benzyl, phenyl-para-tolyl, methyl-ethyl, phenyl-benzyl phosphates and pyrophosphates. Examples of the carboxylic acids include benzoic acid, formic acid, acetic acid, propionic acid, butyric acid, dicarboxylic acids such as oxalic acid, fluorinated acids such as trifluoroacetic acid, and the like. Examples of the sulfonimides include dibenzene sulfonimide, di-para-toluene sulfonimide, methyl-para-toluene sulfonimide, dimethyl sulfonimide, and the like. Examples of the mineral acids include nitric acid, sulfuric add, phosphoric acid, poly-phosphoric acid, and the like. Examples of the Lewis acids include boron and aluminum halides. Examples of the organometallic compounds include organotin compounds such as dibutyltin di-2-ethylhexoate, dibutyltin diisooctyl maleate, dibenzyltin di-2-ethylhexoate, dibutyltin dilaurate, dimethyltin dilaurate, tetrabutyl diacetoxy distannoxane, tetramethyl diacetoxy distannoxane, tetrapropyl diacetoxy distannoxane, dibutyltin dichloride, and the like.

The curable composition of the present invention may also contain, as an optional ingredient, a medium such as a liquid medium to aid the uniform application and transport of the curable composition. Any or all of the ingredients of the curable composition may be contacted with the liquid medium. Moreover, the liquid medium may permit formation of a dispersion, emulsion, invert emulsion, or solution of the ingredients of the curable composition. Particularly preferred is a liquid medium which is a solvent for the curable composition ingredients. Suitable such solvents include aromatic hydrocarbons, aliphatic hydrocarbons, halogenated hydrocarbons, ketones, esters, ethers, amides, alcohols, water, compounds having a plurality of functional groups such as those having an ether and an ester group, and a mixture thereof.

The low formaldehyde emitting curable compositions of the invention may also include varying amounts of other conventional additives well known to those of ordinary skilled in the art of coating, as exemplified by the previously incorporated references. Included among these are additives such as fillers, antioxidants, ultraviolet light stabilizers, pigments such as, for example, $TiO_2$ pigment, flow control agents, plasticizers, mold release agents, corrosion inhibitors, and the like.

The relative amounts of the components in accordance with the present invention are not in general critical. Any proportion of ingredients may be employed that results in a curable coating composition capable of providing a durable, substantially surface defect-free finish after curing. In general, the ratio of the polyfunctional material to the crosslinking agent is in the range of from about 99:1 to about 0.5:1. The weight percent of the cure catalyst, if present, is generally in the range of from about 0.01 to about 3.0 wt % based upon the combined weight of the backbone resin and crosslinker.

Preferably, the amount of crosslinker employed is typically in the range of from about 3 to about 50 wt %, and more preferably in the range of from about 10 to about 30 wt %, of the binder which, for the purposes of the present invention, is the combined weight of the crosslinker and the polyfunctional material (backbone resin). Conversely, the preferred amount of the polyfunctional material employed is typically in the range of from about 70 to about 97 wt %, and more preferably in the range of from about 80 to about 85 wt %, of the binder.

Process of Preparation

The process for preparing the crosslinkers of the present invention comprises the step of contacting a liquid partially alkoxymethylated melamine resin and a reagent selected from the group consisting of an amino group containing compound and an etherification agent. The contacting is carried out at a temperature and length of time sufficient to produce the crosslinkers of the invention which contain less than about 0.5 weight percent free formaldehyde and less than about 6.0 weight percent N-methylol groups, both numbers being based on 100 percent solids. Preferably, the N-methylol group level is less than about 5.0 weight percent and, more preferably, less than about 4.0 weight percent.

Typically, the starting material is a liquid partially alkoxymethylated melamine derivative having 2.6 to 4.6 moles of combined formaldehyde per mole of melamine, 1.4 to 4.4 moles of alkyl per mole of melamine, 1.3 to 3.4 moles of NH per mole of melamine and relatively high N-methylol levels (e.g., greater than 6.0 wt % based on 100 percent solids) and/or free formaldehyde levels (e.g., greater than 0.5 wt % based on 100 percent solids), and includes resins such as CYMEL® 322 crosslinker, CYMEL® 323 crosslinker, CYMEL® 324 crosslinker, CYMEL® 325 crosslinker, CYMEL® 327 crosslinker, CYMEL® 350 crosslinker, CYMEL® 370 crosslinker, CYMEL® 373 crosslinker, CYMEL® 380 crosslinker, CYMEL® 385 crosslinker, and CYMEL® 1158 crosslinker, all products of Cytec Industries, Inc., West Paterson, N.J. A brief description and the degree of oligomerization (average number of triazine units per molecule) are depicted below:

Methoxymethylmelamines

| | |
|---|---|
| CYMEL® 322 | high methylol/imino content, moderate degree of oligomerization (1.75) |
| CYMEL® 323 | high methylol/imino content, moderate degree of oligomerization (1.8) |
| CYMEL® 325 | high methylol/imino content, higher degree of oligomerization (2.3) |
| CYMEL® 327 | high methylol/imino content, moderate degree of oligomerization (1.75) |
| CYMEL® 350 | high methylol/imino content, moderate degree of oligomerization (1.55) |
| CYMEL® 370 | high methylol/imino content, higher degree of oligomerization (2.5) |
| CYMEL® 373 | high methylol/imino content, higher degree of oligomerization (2.0) |
| CYMEL® 380 | high methylol/imino content, higher degree of oligomerization (2.5) |
| CYMEL® 385 | high methylol/imino content, higher degree of oligomerization (1.67) |

Butoxymethyl Melamines

| | |
|---|---|
| CYMEL® 1158 | n-butoxy, high methylol/imino content, high degree of oligomerization (2.7) |

Mixed Alkoxymethyl Melamines

| | |
|---|---|
| CYMEL® 324 | methoxy/n-butoxy, high methylol/imino content, higher degree of oligomerization (2.3) |

Other suitable liquid partially alkoxymethylated melamine derivatives which are not commercially available may be easily prepared from melamine, formaldehyde, and an alcohol at the desired proportions using well known procedures such as those described in, for example, previously incorporated U.S. Pat. No. 4,101,520, U.S. Pat. No. 4,433,143 and U.S. Pat. No. 4,425,466, and well known modifications thereof. For example, melamine may be used as a starting material to produce a partially alkoxymethylated derivative by reaction with an etherification agent, which can be further reacted (for example, in multiple steps) with the etherification agent and/or amino group containing compound. One preferred process is, indeed, a triple etherification of melamine as demonstrated in an example below.

In the practice of the process of the invention, the starting material (containing relatively high levels of N-methylol groups and varying levels of free formaldehyde) and a reagent selected from the group consisting of an amino group containing compound and an etherificaton agent are preferably contacted at a temperature in the range of from about 25° C. to about 120° C., and for a period in the range of about 10 minutes to about 10 hours, to produce a liquid partially alkoxymethylated melamine crosslinker containing less than about 0.5 weight percent free formaldehyde based on 100 percent solids and less than about 6.0 weight percent N-substituted methylol groups based on 100 percent solids. If desired, the procedure may be repeated to further reduce the free formaldehyde and the N-substituted methylol group levels.

The amino group containing compound referred to above is preferably selected from the group consisting of amines, aminotriazines, amides, sulfonamides, phosphoramides, ureas, carbamates, ammonia and a mixture thereof. Amines which are effective in reducing the free formaldehyde and the N-substituted methylol group levels include ammonia and compounds which contain primary and/or secondary amine groups. A mixture containing a plurality of amines may also be used. The amino group containing compound may monofunctional or it may be polyfunctional and it may be monomeric or polymeric. Polyfunctional or polymeric amino group containing compounds which are relatively insoluble in the resin are preferred.

The etherification agent preferably comprises an alcohol and an acid catalyst. Alcohols corresponding to the alkyls referred to above, the preferred being alcohols of 1 to 8 carbon atoms, and especially methanol. A wide variety of acids are usable in the etherification reaction, including the acid catalysts mentioned above, and preferably the strong mineral acids.

The process may further require filtering insoluble materials formed during the reaction and/or it may require stripping volatiles including any unreacted volatile alcohol such as methanol.

While either contacting with an amino group containing compound or contacting with an etherification agent is in and of itself sufficient in reducing the free formaldehyde and N-substituted methylol group levels to very low levels, it has been discovered that by combining the two approaches, very low free formaldehyde and N-substituted methylol group levels are readily achieved. For example, when the amino group containing compound is first contacted and thereafter the etherification agent is contacted, crosslinkers containing less than about 0.3 weight percent free formaldehyde and less than about 4.0 weight percent N-substituted methylol groups are routinely obtained.

Method of Coating

The method of coating of the present invention produces a formaldehyde emission of less than about 7.5 weight percent based on the weight of the crosslinker. The method generally comprises:

(a) applying onto a substrate a curable composition as described above; and thereafter (b) heat-curing the so-applied curable composition.

In the practice of the coating method of the present invention, curable compositions containing a liquid medium such as a solvent may be advantageously used. Contacting may be carried out by dipping, spraying, padding, brushing, flowcoating, electrocoating or electrostatic spraying. Typically, the solvent is allowed to partially evaporate to produce a uniform coating on the substrate. Thereafter, the compositions may be fully cured by further application of heat at a temperature in the range of from about 25° C. to about 300° C. and preferably at a temperature in the range of from about 80° C. to about 220° C. for a period of time preferably in the in the range of about 5 minutes to about 30 minutes to obtain a fully cured coating, film, or object prepared in accordance with the method of the invention.

Uses of the Curable Compositions

The heat cured compositions of this invention may be employed as coatings in the general areas of coatings such as original equipment manufacturing (OEM) including automotive coatings, general industrial coatings including industrial maintenance coatings, architectural coatings, coil coatings, can coatings, wood coatings, and low temperature cure automotive refinish coatings. They are usable as coatings for wire, appliances, automotive parts, furniture, pipes, machinery, and the like. Suitable surfaces include metals such as steel and aluminum, plastics, wood, and glass. The low formaldehyde emitting compositions of the present invention are also well suited for use to refinish automotive parts and to coat heat sensitive substrates such as wood.

The crosslinkers of the present invention may also be used as binders for non-wovens, as textile treatment agents for permanent press textiles, as coating insolublizers for gellation of starch in paper, and as colloidal wet and dry strength agents in paper manufacture. In addition to coatings, curable compositions containing them may be used in adhesives, decorative laminated boards and crosslinked molded articles.

The examples which follow are intended to be illustrative of certain preferred embodiments of the invention and are not to be construed to limit the invention in any manner. In the following examples, all amounts are expressed as parts by weight.

EXAMPLE 1

PART A: Synthesis of a crosslinker of the invention from melamine via triple methylation (etherification):

Melamine (1 mole) was reacted with formaldehyde (4.4 moles) at pH greater than 8.0 between 75–80° C. for 5 minutes. Methanol (320 g, 10 moles) was slowly added over 30 minutes between 75 to 64° C., and a first methylation was then carried out at 64–65° C. and pH=6.0 for 20 minutes. 416 g of methanol was then added, and a second methylation was carried out at 48° C. and pH=5.1 with for 70 minutes. A sample was withdrawn. The monomer content of the withdrawn sample was 55 wt % and OCH3/CH2 ratio was 0.67 by Nuclear Magnetic Resonance spectroscopy (NMR). Subsequently, another 416 g of methanol was added, and a third methylation was carried out at 48° C. and pH=4.2 for 60 minutes to give a resin with properties listed in Table 1.

PART B: Synthesis of a crosslinker of the invention by re-methylation of CYMEL® 325 resin:

382 g of a resin, obtained by removing the solvent from CYMEL® 325 resin, was mixed with 554 g of methanol. The pH was adjusted to 2.3 with 48 g of a concentrated nitric acid, and the reaction temperature was 31° C. After 15 minutes, the reaction was stopped with a caustic solution (20%, 120 g) having a pH of 9.5. Properties of the resulting resin are listed below in Table 1.

TABLE 1

|  | CYMEL® 325 | From PART A | From PART B |
|---|---|---|---|
| Free HCHO (wt %) | 0.52 | 0.06 | 0.06 |
| —CH2OH (wt %) | 8.34 | 5.5 | 3.5 |
| Foil solids (wt %) | 77.1 | 82.3 | 86.2 |
| OCH$_3$/CH$_2$ Mole Ratio | 0.71 | 0.78 | 0.84 |
| Viscosity | — | Z1 | Z4– |
| Total Nitrogen (wt %) | 21.5 | 23.6 | 24.15 |
| Total HCHO (wt %) | 29.8 | 31.3 | 33.4 |
| Monomer (wt %) | 42 | 50 | 41 |
| Molecular Formula | MF$_{3.8}$Me$_{2.7}$ | MF$_{3.7}$Me$_{2.9}$ | MF$_{3.8}$Me$_{3.2}$ |
| Molecular Weight | 278 | 278 | 285 |
| Methylol/Triazine Molar Ratio | 1 | 0.6 | 0.4 |
| Moles NH/triazine | 1.6 | 1.8 | 1.6 |

EXAMPLE 2

PART A. Synthesis of a crosslinker of the invention by treatment of CYMEL® 327 resin with ammonium nitrate (ammonia source):

Ammonium nitrate (10 g) in 10 ml of water was slowly added to a CYMEL® 327 resin (100 g) at 50° C. and pH=9.1. pH was maintained with a caustic solution during the addition (20%, 27 g). The solution was kept under these conditions for 6 hrs., and the volatiles were removed under reduced pressure while maintaining the pH between 10.0 to 10.5. After addition of isobutanol, the insolubles were filtered. The properties of the modified resin are listed in Table 2.

B. Synthesis of a crosslinker of the invention by treatment of CYMEL® 327 resin with aqueous ammonia:

CYMEL® 327 resin (100 g) and a 30 wt % solution of aqueous ammonia (17 g) were mixed and heated to 50° C., and then the pH was adjusted to 9.1 with concentrated HNO3 (3.2 g). The solution was kept under these conditions for 6 hrs., the volatiles were removed under reduced pressure while maintaining the pH between 10.0 to 10.5 then, after addition of isobutanol, the insolubles were filtered. The properties of the modified resin are listed in Table 2.

TABLE 2

|  | CYMEL® 327 | From PART A | From PART B |
|---|---|---|---|
| Free HCHO (wt %) | 0.33 | 0.12 | 0.23 |
| —CH2OH (wt %) | 11.63 | 4.7 | 4.4 |
| Foil solids (wt %) | 89.5 | 87.4 | 85 |
| OCH$_3$/CH$_2$ Mole Ratio | 0.77 | 0.76 | 0.82 |
| Viscosity | Z4+ | — | Z1– |
| Total Nitrogen (wt %) | 24 | 24.2 | 24.7 |
| Total HCHO (wt %) | 36.1 | 35.3 | 34.3 |
| Monomer (wt %) | 62 | 60 | 61 |
| Molecular Formula | MF$_{4.2}$Me$_{3.2}$ | MF$_{4.1}$Me$_{3.1}$ | MF$_{3.9}$Me$_{3.3}$ |
| Molecular Weight | 297 | 292 | 289 |
| Methylol/Triazine Molar Ratio | 1.3 | 0.53 | 0.52 |
| Moles NH/triazine | 1.3 | 1.6 | 1.6 |

EXAMPLE 3

Synthesis of a crosslinker of the invention by treatments of CYMEL® 327 resin with ion-exchange resins PART A. With A-305 ion exchange resin:

CYMEL® 327 resin (20 g) was allowed to react with A-305 ion exchange resin beads (40 ml) at pH=9 in refluxing methanol (80 ml) for a period of 2.5 hrs (A-305 is a product of Sybron Chemicals, Inc., Birmingham, N.J., and may be prepared by the reaction of an epoxide and a polyamine). The mixture was cooled to ambient temperature, the beads were filtered, the methanol was evaporated and isobutanol was added. The properties of the modified resin are listed in Table 3.

Part B. With XR-374 ion exchange resin:

CYMEL® 327 resin (20 g) was allowed to react with XR-374 ion exchange resin beads (40 ml) at pH=8.4 in refluxing methanol (80 ml) for 5 hrs (XR-374 is a product of Sybron Chemicals, Birmingham, N.J., and may be prepared from divinylbenzene and N,N'-dimethyl-3-aminopropyl acrylamide). The mixture was cooled to ambient temperature, the beads were filtered, the methanol was evaporated and isobutanol was added. The properties of the modified resin are listed in Table 3.

TABLE 3

|  | CYMEL® 327 | From PART A | From PART B |
|---|---|---|---|
| Free HCHO (wt %) | 0.42 | 0.49 | 0.07 |
| —CH2OH (wt %) | 10.3 | 5.2 | 3.99 |
| Foil solids (wt %) | 90.9 | 82.1 | 74.8 |
| OCH$_3$/CH$_2$ Mole Ratio | 0.77 | 0.85 | 0.84 |
| Monomer (wt %) | 62 | 61 | 60 |

EXAMPLE 4

PART A. Synthesis of a crosslinker of the invention by treatment CYMEL® 327 resin with XR-374 ion exchange resin followed by etherification with methanol:

200 g of a resin, obtained by removing the solvent from CYMEL® 327 resin, was allowed to react with XR-374 ion exchange resin beads (200 ml) at pH=8.0 in refluxing methanol (278 ml) for 2 hrs. The mixture was cooled to ambient temperature, then the beads were filtered. The pH was lowered to 2.5 with concentrated nitric acid. After 15 minutes, the pH was raised to 9.5 with caustic, the methanol was removed under reduced pressure, isobutanol was added and the insolubles were filtered. The properties of the modified resin are listed in Table 4.

PART B. Synthesis of a crosslinker of the invention by reetherification of CYMEL® 327 resin with methanol:

The pH of a solution of 200 g of a resin, obtained by removing the solvent from CYMEL® 327 resin, in methanol (278 ml) was lowered to 2.5 with concentrated nitric acid at room temperature. After 15 minutes, the pH was raised to 9.5 with caustic, the methanol was removed under reduced pressure, isobutanol was added and the insolubles were filtered. The properties of the modified resin are listed in Table 4.

TABLE 4

|  | CYMEL® 327 | From PART A | From PART B |
|---|---|---|---|
| Free HCHO (wt %) | 0.43 | 0.2 | 0 |
| —CH2OH (wt %) | 8.2 | 2.3 | 4.28 |
| Foil solids (wt %) | 87.8 | 74.5 | 79.3 |
| $OCH_3/CH_2$ Mole Ratio | 0.74 | 0.89 | 0.86 |
| Monomer (wt %) | 65 | 65 | 61 |
| Molecular Formula | $MF_{4.0}Me_{3.0}$ | — | $MF_{4.0}Me_{3.5}$ |
| Molecular Weight | 288 | — | 295 |
| Methylol/Triazine Molar Ratio | 1 | 0.29 | 0.54 |
| Moles NH/triazine | 1.7 | — | 1.6 |

EXAMPLE 5

Synthesis of a crosslinker of the invention by remethylation of CYMEL® 322 Resin:

The pH of a solution of 296 g of a resin, obtained by removing the solvent from CYMEL® 322 resin, in methanol (832 g) was adjusted to 3.77 with a conc. nitric acid (17.8 ml). The reaction was kept at 35° C. for 50 minutes and the pH was adjusted to 9.5 with a caustic (25%, 35 ml). The methanol was then removed under reduced pressure, isopropanol (20 g) was added and the insolubles were filtered. The properties of the unmodified and modified resins are summarized in Table 5.

TABLE 5

|  | Unmodified | Modified |
|---|---|---|
| Pan solid (wt %) | 71.8 | 83.9 |
| Free HCHO (wt %) | 0.9 | 0 |
| —CH2OH (wt %) | 11 | 3 |
| $OCH_3/CH_2$ Mole Ratio | 0.5 | 0.80 |
| Monomer (wt %) | 65 | 60 |

EXAMPLE 6

Cure response and formaldehyde emission: Water borne application Formulation:

Joncryl® 540/Crosslinker of EXAMPLE 2 Weight ratio: 70/30

Solids: 45 wt %

Surfynol® 104: 1.6 wt % on total resin solids (TRS)

Methoxypropanol: 8.5 wt % on TRS

Wire Cater: #52

Substrate: B1000 CRS

Solvent Flash: 15 min.

Cure: 30 min.

HCHO emission: 150° C./30 min. on glass, humid air, 15 min. flash

Joncryl® 540 acrylic resin (S. C. Johnson % Sons); Surfynol® 104 Surfactant (Air Products);

B-1000 panels (Advanced Coating Technology).

TABLE 6

|  | CYMEL® 327 | Crosslinker of EXAMPLE 2 PART A | Crosslinker of EXAMPLE 2-B PART B |
|---|---|---|---|
| 100° C. | | | |
| Mils | 1.25 | 1.37 | 1.25 |
| KHN | 7.0 | 7.2 | 7.9 |
| Pencil | HB—F | HB—F | HB—F |
| MEK | 200 | 200 | 200 |
| % Removed | 1% | 1% | 1% |
| 125° C. | | | |
| Mils | 1.24 | 1.22 | 1.22 |
| KHN | 11.7 | 12.1 | 12.4 |
| Pencil | H—2H | H—2H | H—2H |
| MEK | 200 | 200 | 200 |
| % Removed | slight scratch | slight scratch | slight scratch |
| 150° C. | | | |
| Mils | 1.31 | 1.22 | 1.22 |
| KHN | 13.2 | 12.4 | 12.9 |
| Pencil | H—2H | H—2H | H—2H |
| MEK | 200+ | 200+ | 200+ |
| % Removed | No Mar | No Mar | No Mar |
| % HCHO Emission (%) (wt % emitted HCHO based on cured film) | 2.9 | 1.9 | 1.7 |
| % HCHO Emission (wt % emitted HCHO based on crosslinker) | 9.7 | 6.3 | 5.7 |

EXAMPLE 7

Cure response and formaldehyde emission: Solvent borne application Formulation:

Acryloid® AT400/Crosslinker of Example 2 Weight ratio: 70/30

Solids: 66% n-BuOH: 20% on TRS

Solvent: 11.4% Xylene on TRS

Cure: 30 min.

Cater: #34 for 125 and 150° C./30 min. cure and #52 for 100° C./30 min. cure

Acryloid® AT-400 acrylic resin (Rohm and Haas Co., Philadelphia, Pa.).

TABLE 7

|  | CYMEL® 327 | Crosslinker of EXAMPLE 2 PART A | Crosslinker of EXAMPLE 2 PART B |
|---|---|---|---|
| 100° C. | | | |
| Mils | 1.38 | 1.33 | 1.29 |
| KHN | 7.4 | 5.1 | 5.3 |
| Pencil | F | HB | F |
| MEK | 200 | 85 | 140 |
| % Removed | 2 | 50 | 50 |
| 125° C. | | | |
| Mils | 0.95 | 0.98 | 0.97 |
| KHN | 13.9 | 14 | 13.6 |
| Pencil | H | H | H |
| MEK | 200+ | 200+ | 200+ |
| % Removed | No Mar | No Mar | No Mar |
| 150° C. | | | |
| Mils | 0.95 | 0.95 | 0.94 |
| KHN | 15.8 | 14.2 | 14.4 |
| Pencil | 2H | 2H | 2H |
| MEK | 200+ | 200+ | 200+ |
| % Removed | No Mar | No Mar | No Mar |
| % HCHO Emission (wt % emitted HCHO based on cured film) | 2.29 | 1.31 | 1.49 |
| % HCHO Emission (wt % emitted HCHO based on crosslinker) | 7.6 | 4.4 | 5.0 |

EXAMPLE 8

Cure responses and formaldehyde emission studies: Water borne application Formulation:

Joncryl® 540/Crosslinker of Example 1 Weight ratio: 70/30

Solids: 45 wt %

Surfynol® 104: 1.6 wt % on TRS

Methoxypropanol: 3.8 wt % on TRS

Cater #52

Substrate: B1000 CRS

Flash: 15 min.

Cure: 30 min.

HCHO emission: 150° C./30 min. on glass, humid air, 15 min. flash

TABLE 8

|  | CYMEL® 325 | Crosslinker of EXAMPLE 1 PART A | Crosslinker of EXAMPLE 1 PART B |
|---|---|---|---|
| 100° C. | | | |
| Mils | 1.2 | 1.2 | 1.3 |
| KHN | 9.3 | 8.6 | 7.4 |
| Pencil | F | F | F |
| MEK | 200 | 200 | 200 |
| % Removed | 5 | 2 | 35 |
| 125° C. | | | |
| Mils | 1.2 | 1.2 | 1.2 |
| KHN | 11.4 | 11.4 | 11.9 |
| Pencil | H | H | H |
| MEK | 200 | 200 | 200 |
| % Removed | scratch | scratch | slight scratch |
| 150° C. | | | |
| Mils | 1.2 | 1.1 | 1.2 |
| KHN | 12.2 | 11.7 | 11.9 |
| Pencil | H | H | H |
| MEK | 200+ | 200+ | 200+ |
| % Removed | No Mar | No Mar | very slight scratch |
| % HCHO Emission (wt % emitted HCHO based on cured film) | 3.0 | 1.8 | 1.8 |
| % HCHO Emission (wt % emitted HCHO based on crosslinker) | 10.0 | 6.0 | 6.0 |

EXAMPLE 9

Cure responses and formaldehyde emission studies: Solvent borne application Formulation:

ACRYLIOD® AT-400/Crosslinker of Example 1 Weight ratio: 70/30

Solids: 66 wt % n-BuOH: 20 wt % on TRS

Solvent: 11.4 wt % Xylene on TRS

Cater: #34 for 125 and 150° C./30 min. and #52–100° C./30 min.

Cure: 30 min.

TABLE 9

|  | CYMEL® 325 | Crosslinker of EXAMPLE 1 PART A | Crosslinker of EXAMPLE 1 PART B |
|---|---|---|---|
| 100° C. | | | |
| Mils | 1.37 | 1.37 | 1.38 |
| KHN | 9.9 | 8.0 | 5.3 |
| Pencil | F | F | F |
| MEK | 200 | 185 | 150 |
| % Removed | 20 | 50 | 50 |
| 125° C. | | | |
| Mils | 0.95 | 0.98 | 0.95 |
| KHN | 15.3 | 14.9 | 13 |
| Pencil | 2H | 2H | H |
| MEK | 200+ | 200+ | 200+ |
| % Removed | No Mar | No Mar | No Mar |
| 150° C. | | | |
| Mils | 0.91 | 0.95 | 0.95 |
| KHN | 17.8 | 17.2 | 15.4 |
| Pencil | 2H | 2H | 2H |
| MEK | 200+ | 200+ | 200+ |
| % Removed | No Mar | No Mar | No Mar |
| % HCHO Emission wt % emitted HCHO based on cured film) | 2.62% | 1.72% | 1.00% |
| % HCHO Emission wt % emitted HCHO based on crosslinker) | 8.7 | 5.7 | 3.3 |

EXAMPLE 10

Cure responses and formaldehyde emission studies: Waterborne application Formulation:

Joncryl® 540 acrylic resin/Crosslinker of Example 5
Weight ratio: 71.7/28.5

Catalyst: 2.0 wt % Cycat® 4045 cure catalyst based on TRS

Cosolvent: 8.4 wt % Methoxy Propanol on TRS

Surfynol® 104: 1.5 wt % on TRS

Solids: 43 wt % TRS

Hold: 10 min.

Cater: #52

Substrate: B100 CRS

Cure: 20 min.

HCHO Emission: 150° C./30 min. humid air

TABLE 10

|  | CYMEL® 322 | CROSSLINKER OF EXAMPLE 5 |
|---|---|---|
| 120° C. | | |
| Mils | 1.2 | 1.2 |
| KHN | 8.2 | 9 |
| MEK | 200+ | 200+ |
| % Removed | 5 | very scratched |
| 150° C. | | |
| Mils | 1.2 | 1.2 |
| KHN | 9.9 | 10.8 |
| MEK | 200+ | 200+ |
| % Removed | very scratched | No Mar |
| % HCHO Emission (wt % emitted HCHO based on cured film) | 2.23 | 1.21 |
| % HCHO Emission (wt % emitted HCHO based on crosslinker) | 7.8 | 4.3 |

EXAMPLE 11

Cure response and formaldehyde emission: Waterborne application Formulation: Acryloid® AT 400/Crosslinker of EXAMPLE 4 Weight ratio: 70/30

Solids: 66 wt % n-BuOH: 15 wt % on TRS

No Catalyst

Cure: 30 min.

TABLE 11

|  | CYMEL® 327 | Crosslinker of EXAMPLE 4 PART A |
|---|---|---|
| 100° C. | | |
| Mils | 1.05 | 1.05 |
| KHN | 12.4 | 12.7 |
| MEK | 200+ | 200+ |
| 125° C. | | |
| Mils | 1.00 | 1.00 |
| KHN | 14.6 | 14.3 |
| MEK | 200+ | 200+ |
| 150° C. | | |
| Mils | 1.00 | 0.95 |
| KHN | 15.8 | 14.3 |
| MEK | 200+ | 200+ |
| % HCHO Emission (wt % emitted HCHO based on cured film) | 2.94 | 1.74 |
| % HCHO Emission (wt % emitted HCHO based on crosslinker) | 9.8 | 5.8 |

Although the present invention is described with reference to certain preferred embodiments, it is apparent that modifications and variations thereof may be made by those skilled in the art without departing from the scope of this invention as defined by the appended claims.

What is claimed is:

1. A liquid partially alkoxymethylated melamine crosslinker composition having from about 2.6 to about 4.6 moles of combined formaldehyde to per mole of melamine; from about 1.4 to about 4.4 moles of alkyl per mole of melamine; from about 1.3 to about 3.4 moles of NH per mole of melamine and a free formaldehyde level of less than about 0.5 weight percent based on 100 percent solids, wherein said crosslinker composition is prepared by a process comprising the steps of:
    (i) reacting melamine with formaldehyde;
    (ii) reacting the product from (i) with an etherifying agent;
    (iii) reacting the product from (ii) with an etherifying agent; then
    (iv) reacting the product from (iii) with an etherifying agent.

2. The liquid partially alkoxymethylated melamine crosslinker composition of claim 1, wherein the combined formaldehyde to melamine molar ratio is in the range of from about 2.6 to about 3.4; the alkyl to melamine molar ratio is in the range of from about 1.4 to about 3.2; and the NH to melamine molar ratio is in the range of from about 1.8 to about 3.4.

3. The liquid partially alkoxymethylated melamine crosslinker composition of claim 1, wherein the combined formaldehyde to melamine molar ratio is in the range of from about 3.0 to about 3.4; the alkyl to melamine molar ratio is in the range of from about 2.4 to about 2.8; and the NH to melamine molar ratio is in the range of from about 2.0 to about 2.8.

4. The liquid partially alkoxymethylated melamine crosslinker composition of claim 1, wherein the combined formaldehyde to melamine molar ratio is in the range of from about 3.6 to about 4.6; the alkyl to melamine molar ratio is in the range of from about 2.4 to about 4.4; and the NH to melamine molar ratio is in the range of from about 1.3 to about 2.4.

5. The liquid partially alkoxymethylated melamine crosslinker composition of claim 1, wherein the combined formaldehyde to melamine molar ratio is in the range of from about 3.8 to about 4.2; the alkyl to melamine molar ratio is in the range of from about 2.6 to about 3.8; and the NH to melamine molar ratio is in the range of from about 1.4 to about 1.8.

6. The liquid partially alkoxymethylated melamine crosslinker composition of claim 1, wherein the combined formaldehyde to melamine molar ratio is in the range of from about 3.8 to about 4.0; the alkyl to melamine molar ratio is in the range of from about 2.6 to about 3.0; and the NH to melamine molar ratio is in the range of from about 1.4 to about 1.6.

7. The liquid partially alkoxymethylated melamine crosslinker composition of claim 1, wherein the N-methylol level is less than about 5.0 weight percent based on 100 percent solids.

8. The liquid partially alkoxymethylated melamine crosslinker composition of claim 7, wherein the N-methylol level is less than about 4.0 weight percent based on 100 percent solids.

9. The liquid partially alkoxymethylated melamine crosslinker composition of claim 1, comprising at least about 30 wt % monomer.

10. The liquid partially alkoxymethylated melamine crosslinker composition of claim 9, comprising from about 40 wt % to about 65 wt % monomer.

11. The liquid partially alkoxymethylated melamine crosslinker composition of claim 1, wherein the alkoxy group of the partially alkoxymethylated melamine is independently based on an alkyl group selected from the group consisting of linear, branched and cyclic alkyls of 1 to 20 carbon atoms.

12. The liquid partially alkoxymethylated melamine crosslinker of claim 11, wherein the alkoxy group of the partially alkoxymethylated melamine is independently based on an alkyl group selected from the group consisting of lower alkyls of 1 to 8 carbon atoms.

13. The liquid partially alkoxymethylated melamine crosslinker of claim 12, wherein the alkoxy group of the partially alkoxymethylated melamine is independently based on an alkyl group selected from the group consisting of methyl, ethyl, butyl and a mixture thereof.

14. A liquid partially alkoxymethylated melamine crosslinker composition having from about 2.6 to about 4.6 moles of combined formaldehyde to per mole of melamine; from about 1.4 to about 4.4 moles of alkyl per mole of melamine; from about 1.3 to about 3.4 moles of NH per mole of melamine and a free formaldehyde level of less than about 0.5 weight percent based on 100 percent solids, wherein said crosslinker composition is prepared by a process comprising the step of contacting a liquid partially alkoxymethylated melamine crosslinker starting material having greater than about 0.5 weight percent free formaldehyde based on 100 percent solids and greater than about 6 weight percent N-substituted methylol groups based on 100 percent solids, and a reagent selected from the group consisting of an amino group containing compound and an etherification agent, said contacting being carried out at a temperature and length of time sufficient to produce a liquid partially alkoxymethylated melamine crosslinker containing less than 0.5 weight percent free formaldehyde based on 100 percent solids and less than 6 weight percent N-substituted methylol groups based on 100 percent solids.

15. The liquid partially alkoxymethylated melamine crosslinker composition of claim 14, wherein the combined formaldehyde to melamine molar ratio is in the range of from about 2.6 to about 3.4; the alkyl to melamine molar ratio is in the range of from about 1.4 to about 3.2; and the NH to melamine molar ratio is in the range of from about 1.8 to about 3.4.

16. The liquid partially alkoxymethylated melamine crosslinker composition of claim 14, wherein the combined formaldehyde to melamine molar ratio is in the range of from about 3.0 to about 3.4; the alkyl to melamine molar ratio is in the range of from about 2.4 to about 2.8; and the NH to melamine molar ratio is in the range of from about 2.0 to about 2.8.

17. The liquid partially alkoxymethylated melamine crosslinker composition of claim 14, wherein the combined formaldehyde to melamine molar ratio is in the range of from about 3.6 to about 4.6; the alkyl to melamine molar ratio is in the range of from about 2.4 to about 4.4; and the NH to melamine molar ratio is in the range of from about 1.3 to about 2.4.

18. The liquid partially alkoxymethylated melamine crosslinker composition of claim 14, wherein the combined formaldehyde to melamine molar ratio is in the range of from about 3.8 to about 4.2; the alkyl to melamine molar ratio is in the range of from about 2.6 to about 3.8; and the NH to melamine molar ratio is in the range of from about 1.4 to about 1.8.

19. The liquid partially alkoxymethylated melamine crosslinker composition of claim 14, wherein the combined formaldehyde to melamine molar ratio is in the range of from about 3.8 to about 4.0; the alkyl to melamine molar ratio is in the range of from about 2.6 to about 3.0; and the NH to melamine molar ratio is in the range of from about 1.4 to about 1.6.

20. The liquid partially alkoxymethylated melamine crosslinker composition of claim 14, wherein the N-methylol level is less than about 5.0 weight percent based on 100 percent solids.

21. The liquid partially alkoxymethylated melamine crosslinker composition of claim 20, wherein the N-methylol level is less than about 4.0 weight percent based on 100 percent solids.

22. The liquid partially alkoxymethylated melamine crosslinker composition of claim 20, comprising at least about 30 wt % monomer.

23. The liquid partially alkoxymethylated melamine crosslinker composition of claim 22, comprising from about 40 wt % to about 65 wt % monomer.

24. The liquid partially alkoxymethylated melamine crosslinker composition of claim 14, wherein the alkoxy group of the partially alkoxymethylated melamine is independently based on an alkyl group selected from the group consisting of linear, branched and cyclic alkyls of 1 to 20 carbon atoms.

25. The liquid partially alkoxymethylated melamine crosslinker of claim 24, wherein the alkoxy group of the partially alkoxymethylated melamine is independently based on an alkyl group selected from the group consisting of lower alkyls of 1 to 8 carbon atoms.

26. The liquid partially alkoxymethylated melamine crosslinker of claim 25, wherein the alkoxy group of the partially alkoxymethylated melamine is independently based on an alkyl group selected from the group consisting of methyl, ethyl, butyl and a mixture thereof.

27. A curable composition comprising:
  (i) a liquid partially alkoxymethylated melamine crosslinker composition having from about 2.6 to about 4.6 moles of combined formaldehyde to per mole of melamine; from about 1.4 to about 4.4 moles of alkyl per mole of melamine; from about 1.3 to about 3.4 moles of NH per mole of melamine; a free formaldehyde level of less than about 0.5 weight percent based on 100 percent solids; and an N-methylol level of less than about 6.0 weight percent based on 100 percent solids; and
  (ii) a polyfunctional material reactive therewith, which, when cured, produces a formaldehyde emission of less than 7.5 weight percent based on the weight of the crosslinker.

28. The curable composition of claim 27, wherein in (i) the combined formaldehyde to melamine molar ratio is in the range of from about 2.6 to about 3.4; the alkyl to melamine molar ratio is in the range of from about 1.4 to about 3.2; and the NH to melamine molar ratio is in the range of from about 1.8 to about 3.4.

29. The curable composition of claim 27, wherein in (i) the combined formaldehyde to melamine molar ratio is in the range of from about 3.0 to about 3.4; the alkyl to melamine molar ratio is in the range of from about 2.4 to about 2.8; and the NH to melamine molar ratio is in the range of from about 2.0 to about 2.8.

30. The curable composition of claim 27, wherein in (i) the combined formaldehyde to melamine molar ratio is in the range of from about 3.6 to about 4.6; the alkyl to melamine molar ratio is in the range of from about 2.4 to about 4.4; and the NH to melamine molar ratio is in the range of from about 1.3 to about 2.4.

31. The curable composition of claim 27, wherein in (i) the combined formaldehyde to melamine molar ratio is in the range of from about 3.8 to about 4.2; the alkyl to melamine molar ratio is in the range of from about 2.6 to about 3.8; and the NH to melamine molar ratio is in the range of from about 1.4 to about 1.8.

32. The curable composition of claim 27, wherein in (i) the combined formaldehyde to melamine molar ratio is in the range of from about 3.8 to about 4.0; the alkyl to melamine molar ratio is in the range of from about 2.6 to about 3.0; and the NH to melamine molar ratio is in the range of from about 1.4 to about 1.6.

33. A method of coating which produces a formaldehyde emission of less than 7.5 weight percent based on the weight of the crosslinker, said method comprising:
   (a) applying onto a substrate a curable composition, which comprises:
      (i) a liquid, partially alkoxymethylated melamine crosslinker composition having from about 2.6 to about 4.6 moles of combined formaldehyde per mole of melamine, from about 1.4 to about 4.4 moles of alkyl per mole of melamine, from about 1.3 to about 3.4 moles of NH per mole of melamine, a free formaldehyde level of less than about 0.5 weight percent based on 100 percent solids, and an N-methylol level of less than about 6.0 weight percent based on 100 percent solids; and
      (ii) a polyfunctional material reactive therewith; and thereafter
   (b) heat-curing said curable composition.

34. The method of claim 33, wherein in (a)(i) the combined formaldehyde to melamine molar ratio is in the range of from about 2.6 to about 3.4; the alkyl to melamine molar ratio is in the range of from about 1.4 to about 3.2; and the NH to melamine molar ratio is in the range of from about 1.8 to about 3.4.

35. The method of claim 33, wherein in (a)(i) the combined formaldehyde to melamine molar ratio is in the range of from about 3.0 to about 3.4; the alkyl to melamine molar ratio is in the range of from about 2.4 to about 2.8; and the NH to melamine molar ratio is in the range of from about 2.0 to about 2.8.

36. The method of claim 33, wherein in (a)(i) the combined formaldehyde to melamine molar ratio is in the range of from about 3.6 to about 4.6; the alkyl to melamine molar ratio is in the range of from about 2.4 to about 4.4; and the NH to melamine molar ratio is in the range of from about 1.3 to about 2.4.

37. The method of claim 33, wherein in (a)(i) the combined formaldehyde to melamine molar ratio is in the range of from about 3.8 to about 4.2; the alkyl to melamine molar ratio is in the range of from about 2.6 to about 3.8; and the NH to melamine molar ratio is in the range of from about 1.4 to about 1.8.

38. The method of claim 33, wherein in (a)(i) the combined formaldehyde to melamine molar ratio is in the range of from about 3.8 to about 4.0; the alkyl to melamine molar ratio is in the range of from about 2.6 to about 3.0; and the NH to melamine molar ratio is in the range of from about 1.4 to about 1.6.

39. A crosslinked film or coated article prepared by the method of claim 33.

* * * * *